(12) United States Patent
Hall

(10) Patent No.: US 6,708,443 B2
(45) Date of Patent: Mar. 23, 2004

(54) MOSQUITO BREEDING CONVENIENCE WITH BIO-CYCLE INTERRUPT AND WITH MID-CYCLE FLUSH

(76) Inventor: Donald R. Hall, 309 N. Fillmore St., Arlington, VA (US) 22201

( * ) Notice: Subject to any disclaimer, the term of this patent is extended or adjusted under 35 U.S.C. 154(b) by 0 days.

(21) Appl. No.: 09/991,139

(22) Filed: Nov. 15, 2001

(65) Prior Publication Data

US 2002/0121045 A1 Sep. 5, 2002

Related U.S. Application Data

(60) Provisional application No. 60/248,216, filed on Nov. 15, 2000.

(51) Int. Cl.[7] .............................. A01M 1/00; A01M 1/02
(52) U.S. Cl. ........................................ 43/107; 43/132.1
(58) Field of Search ................................ 43/107, 132.1, 43/131, 110, 55, 56; 210/237, 238, 470, 471; 119/69.5; 99/407

(56) References Cited

U.S. PATENT DOCUMENTS

| | | | | | |
|---|---|---|---|---|---|
| 129,350 | A | * | 7/1872 | Le Roy | 43/110 |
| 625,677 | A | * | 5/1899 | Heymann | 43/107 |
| 1,003,259 | A | * | 9/1911 | Hill | 210/237 |
| 1,073,914 | A | * | 9/1913 | Lee | 43/132.1 |
| 1,262,241 | A | * | 4/1918 | Owen | 210/237 |
| 2,767,507 | A | * | 10/1956 | Chiambretti | 43/55 |
| 2,860,444 | A | * | 11/1958 | McHugh | 43/56 |
| 2,908,105 | A | * | 10/1959 | Rogers | 43/55 |
| 3,048,937 | A | * | 8/1962 | Hustad | 43/55 |
| 3,078,786 | A | * | 2/1963 | Arvan | 99/407 |
| 3,105,320 | A | * | 10/1963 | Milanos et al. | 43/56 |
| 3,372,784 | A | * | 3/1968 | Ross et al. | 43/56 |
| 3,501,316 | A | * | 3/1970 | Guthrie, Sr. | 99/407 |
| 3,995,591 | A | * | 12/1976 | Garwood | 119/69.5 |
| 3,997,999 | A | * | 12/1976 | Evans | 43/107 |
| 4,002,146 | A | * | 1/1977 | Neff | 119/51.04 |
| 4,019,459 | A | * | 4/1977 | Neff | 119/51.04 |
| 4,328,636 | A | * | 5/1982 | Johnson | 43/107 |
| 4,630,569 | A | * | 12/1986 | Dieleman | 119/69.5 |
| 5,123,201 | A | * | 6/1992 | Reiter | 43/107 |
| 5,301,604 | A | * | 4/1994 | Takahashi | 99/407 |
| 5,896,697 | A | * | 4/1999 | Kang | 43/107 |
| 5,937,741 | A | * | 8/1999 | Manger | 99/407 |
| 5,983,557 | A | * | 11/1999 | Perich et al. | 43/132.1 |
| 6,023,884 | A | * | 2/2000 | Yanohara | 43/132.1 |
| 6,040,491 | A | * | 3/2000 | Sjowall | 210/237 |
| 6,079,951 | A | * | 6/2000 | Morton | 119/69.5 |
| 6,199,316 | B1 | * | 3/2001 | Coventry | 43/132.1 |
| 6,274,047 | B1 | * | 8/2001 | Bates et al. | 210/238 |
| 6,305,122 | B1 | * | 10/2001 | Iwao et al. | 43/112 |
| 6,338,220 | B1 | * | 1/2002 | Dicks | 43/132.1 |
| 6,618,984 | B1 | * | 9/2003 | Li | 43/107 |

FOREIGN PATENT DOCUMENTS

| | | | | |
|---|---|---|---|---|
| DE | 280684 | B1 * | 7/1990 | 43/4 |
| FR | 2487167 | B1 * | 1/1982 | 43/132.1 |
| JP | 10-146145 | B1 * | 6/1998 | |
| JP | 2000-232840 | B1 * | 8/2000 | |
| RU | 829075 | B1 * | 5/1981 | 43/60 |
| RU | 2011343 | B1 * | 4/1994 | 43/107 |

* cited by examiner

Primary Examiner—Darren W. Ark
(74) Attorney, Agent, or Firm—Hollander Law Firm, P.L.C.

(57) ABSTRACT

An apparatus configured to provide standing water at convenient locations for the use of mosquitoes to lay eggs. After eggs are deposited in the development cycle of the egg, the larva, pupa, adult life stage are interrupted by denying the proper environment to sustain their development. Also disclosed is an apparatus to abate mosquito populations which provides a convenient and attractive reservoir of liquid situated to encourage use by mosquitoes for egg laying. At intervals the liquid in the reservoir is flushed or filtered eliminating mosquito biomass developing in the liquid. The bio-matter is substantially removed and aborts the development of the bio-matter into adult insects.

14 Claims, 8 Drawing Sheets

MOSQUITO BREEDING CONVENIENCE WITH BIO-CYCLE INTERRUPT AND WITH MID-CYCLE FLUSH

CROSS-REFERENCE TO RELATED APPLICATION

This application claims the benefit under 35 U.S.C. 119(e) of provisional application No. 60/248,216 filed Nov. 15, 2000 in the name of Donald R. Hall, for "Mosquito Breeding Convenience with Bio-cycle Interrupt," the disclosure of which is incorporated by reference in its entirety.

BACKGROUND OF THE INVENTION

Mosquitoes are responsible for a great deal of human misery, expense, and death throughout the world. They carry diseases that sicken one-eighth of the world's population and impact the health and economy of 300 million people a year. In Developing Countries, mosquito-borne diseases are the leading cause of death.

Mosquito control is accomplished mainly by spraying pesticides, when economic conditions permit. The most common methods of controlling mosquitoes involve the use of insecticide sprays and poisons. The United States has relied on pesticides and has easy access to the chemicals and the funds to deploy them. The chemicals have been effective and consequently the impact mosquitoes can have on people has been largely absent in this country. However, new threats have come to the U.S. from mosquitoes that are carrying viruses dangerous to humans. Further, for many communities, the cost of spraying is prohibitive. Still further, it is known that mosquitoes are becoming resistant to pesticides and exposed insects that survive and mate and reproduce progeny that again will experience insecticide and inevitably, there will be more survivors. Repetitions of this cycle will produce toxin resistant insects.

Some species of mosquitoes carry viruses harmful to humans and are responsible for millions of deaths around the world. These mosquito borne viruses are entering the United States along with new species of mosquitoes. Several species of mosquito have entered the United States that are aggressive and carry viruses threatening human health. Deaths have occurred in the North East and the South West United States.

In the region of the East Coast of the U.S. during the years 1999 and 2000 mosquitoes have thrived. The level of nuisance has grown but more important the mosquitoes have been transmitting the West Nile virus. The virus has occurred in the cities of New York, Baltimore and Richmond Va. and the number of sites is growing. Health services have announced a request that families and persons check for standing water breeding areas, and eliminate them, in an attempt to deny mosquitoes breeding opportunities. Since the discovery of the West Nile virus in the New York area, and the seven deaths last year, U.S. Center for Disease Control has appointed a special director to coordinate containment efforts. Congress has allocated funding to be used to control the spread and impact of the virus.

Birds bitten by infected mosquitoes can fly long distances after becoming infected and thereafter any mosquito biting an infected bird will become infected. When the newly infected mosquito bites another, animal it is infected. This results in a very effective delivery system and infected birds carrying the virus from New Jersey found as far South as Florida and North Carolina, less than two years after the virus was introduced in New Jersey.

The Federal Government has provided substantially supplemented budgets to local government entities to help them acquire the chemicals in order to be responsive to the mosquito outbreaks that are being experienced across the country. After a recent deluge in Texas, mosquito populations there ballooned, and the community was advised to stay indoors. All available spraying equipment was in use 24 hours a day and Federal Emergency Management resources were activated. Activation of the Texas National Guard for manpower assistance was under consideration and may have occurred.

These mosquitoes are carrying harmful viruses and more aggressive species are entering the country. One new mosquito species in the U.S. is the Asian tiger mosquito, which arrived in a load of old tires shipped from Japan for recapping.

When outbreaks trigger citizen complaints the only option available to local authorities is often the use of Adultacides. These chemicals are only sprayed after announcing to communities to stay indoors while it is being done. The chemicals used to attack the adults are highly toxic. Adultacide use is avoided if possible due to their negative impact on other flora and fauna.

Typically the most common spraying targets are wet areas where mosquitoes breed. Chemicals are used to poison the mosquito larva living in the water. This requires repeated application, continuing expenses and results in undesirable toxic accumulation.

The "wetlands" water treatment programs being developed in the U.S. are concerned with the complaint that the success in creating natural appearing wetland providing water treatment is also creating massive mosquito nurseries. The use of insecticides in the wetlands to control mosquitoes is expensive and runs against the environmental quality philosophy supporting such projects. Substantial effort is being made to reduce the mosquitoes in less toxic ways.

Regardless of pesticide toxicity, the U.S. economy can afford to expend the resources to carry out extensive spraying programs. Developing Nations are usually unable to afford the expense of these programs and consequently they are burdened by the consequences and continuous drain on their health care systems. Many people die each year from Yellow Fever, Malaria, Encephalitis and other vector borne diseases.

The invention discussed herein proposes a method of providing convenient standing water for the use of mosquitoes (and other interrupting mosquito breeding), as well as other low cost methods to abate mosquito populations without the use of insecticides. In another embodiment of the present invention, simple low cost methods are disclosed to abate mosquito populations with minimal expense, without insecticide, and requiring little continued expense to be effective.

SUMMARY OF THE INVENTION

The strategic placement of the devices of the present invention may encourage their use by mosquitoes. The invention comprises a method to interrupt the development cycle of newly spawned mosquito eggs and larva. Mosquitoes making use of the convenient location may choose it over the natural areas, which they always seem to find. It is anticipated that experimentation will provide information that will allow implementing ways of increasing the appeal of the facilities appeal to the target insect.

The concept is to program the device to activate often enough to destroy any water dependent biomass deposited or developing in the water. After the eggs are in the still water the apparatus will act on the water to disrupt the developmental stages of insect.

Several ways of providing such a facility are apparent. Other improvements can be discovered and added to create a successful program. The devices should be low cost, no maintenance (if possible), and not create any new insect problems. The standing water could be provided rainfall where feasible and the weather cooperative. Barring this availability of water the device could be placed in the hands of volunteers interested in reducing the mosquito population in their area. A bird-bath that is equipped with the filter assembly similar to FIG. 10, FIG. 11 and FIGS. 12A–12C could reduce the mosquito population in residential areas. The common bird-bath is a common facility used by mosquitoes for reproduction. Bird baths can take advantage of nearby power to sustain use of lights and a reliable water supply to sustain the breeding facility.

In another embodiment of the present invention, effective methods of diminishing mosquito populations as discussed herein can be applied to create a low cost toxin free method of interfering in the life cycle of these insects as they develop in nonnatural breeding sites made convenient to them for egg laying.

Some mosquitoes are known as container breeders, and they will seek out opportunities to lay eggs in discarded soda cans, bottle caps, dog dishes, rainwater remaining in rain gutters, or any other convenient reservoir of water. The methodology disclosed herein is contrary to most anti mosquito protocols, which are oriented to eliminating or poisoning breeding water available to mosquitoes for reproduction.

By providing a convenient and possibly attractive breeding facility for mosquito use, it is then possible to intervene and disrupt the development cycle of egg, larva, pupa, adult that naturally occurs in the reproductive of mosquitoes. Accordingly, another embodiment of the present invention comprises a method to remove a serious man-made mosquito breeding convenience. Rain gutters that have not properly drained and have stagnant water remaining in them, enable mosquitoes to invade neighborhoods using the gutters as nurseries. By using rain gutters that slowly leak one can retain the effectiveness to carry the bulk rain water away from a buildings foundation, but any water improperly drained will leak through the porous bottom of the channel. A female mosquito must have a blood meal from a host in order to develop eggs. After this meal, the mosquito will seek out a suitable body of water to lay eggs. The water is typically stagnant non-moving water preferably shaded, but the preferences vary between species. The shape and size of the embodiment can be customized to the features that the targeted mosquitoes prefer.

There are two methods to interrupt the mosquito development cycle that can be broadly addressed as Filter and Flush. The Flushing methodology has the added benefit of refreshing the water and thus avoids the issue of female mosquitoes rejecting water that may have pheromones released from dead mosquitoes building up in the water. The Filtering method lifts the filtered Bio-matter out of the water as well.

Removal of mosquito bio-matter can be done using a very wide variety of devices. Only some of them are selected for definition herein. The intelligent control and timing for purging the water in the reservoir can be derived from a person manually carrying out the procedure or it can be controlled automatically by an electronic microcontroller. Heat activated metal movement can successfully raise a filter through the water resulting from solar temperature change of a bi-metal spring supporting the filter after sunrise occurred and heated the metal. In this way, the present inventor has found a device that could be maintenance free and operate for extended periods in areas in undeveloped countries near water reservoirs.

In systems that use motors for motion a small solar panel was used to keep a battery charged. With a requirement for the filtering, pumping or lifting only once every three days the solar panel is easily able to maintain the battery. It is only necessary to spoil the development once during the development of the egg, larva, pupa, and adult cycle to abort the development of the young mosquitoes The scale of the device can be as small as a bottle cap or it may be an unlimited run of channel placed between a housing community and a wetland. Recreational Parks that are used at night are often near water and streams. Mosquitoes receiving blood meals from park users will typically return to their hatching place to lay eggs. Long lengths of the Abatement Channels can be installed that are between the park and natural water that the mosquitoes will use conveniently. Every three days the channel will be flooded with replacement water and the bio-matter will be flushed away. The channel may be flushed at any interval but a three-day interval will act on a hatch at least twice before there is time for them to mature into adults.

These mosquito abatement techniques and methods are very inexpensive and can be implemented in the poorest of communities in the world, which is where the mosquitoes are causing the most misery.

In yet another embodiment of the present invention, a variety of additives mixed with the liquid in the reservoir may make it more attractive to the mosquito. It is assumed that some attractant could be added to the water that would make it the most attractive site for a female mosquito seeking a place to lay eggs. The best formula for this "Mosquito Tea" will develop over time with data collection and experimentation. The mixture now used is Tannin, straw, and manure.

The objects and advantages of the insect bio-cycle interrupt and insect abatement techniques of the present invention are to provide:

An apparatus comprising a reservoir for holding a liquid medium suitable for reproductive use by mosquitoes or for harboring adult mosquitoes wherein said reservoir is located so as to harbor mosquitoes or to lure a female mosquito to deposit eggs in said liquid medium, said apparatus further comprising a periodically activated means to destroy the life of any stage of maturing egg deposits, larva, pupa and adults. Further, said apparatus comprising a reservoir of water and a filter located beneath said reservoir, wherein periodically said filter is raised through reservoir of water and filters any insect material out of said water, and further wherein said filter remains out of said water for a period of time that eliminates any further life of any insect material on the filter. Still further, said apparatus wherein said reservoir of liquid is suitable for sustaining the growth of mosquito reproductive matter and said means to destroy comprises a liquid or a biomass removal means for terminating said growth. Yet still further, an apparatus comprising a reservoir of liquid containing mosquito biomass wherein said liquid is passed through a filtering means to reduce said liquid quantity of said biomass.

A reservoir and means to destroy life wherein said reservoir holds a liquid suitable for reproductive use by mosquitoes and wherein said means to destroy comprises a flushing means for flushing said liquid out of said reservoir and replacing said liquid with a clean supply of said liquid.

Further, a reservoir and means to destroy life wherein energy to power said flushing means is supplied by a battery or by a utility company.

A reservoir and means to destroy life additionally comprising a collection filter wherein said mosquito eggs, larva and pupa are preserved for scientific analysis.

A reservoir and means to destroy life comprising a lawn ornament containing a liquid.

A loop of metal formed as two parabolic shapes joined at end points to close said loop and internal surface of said loop is grooved in the form of a parabolic and further comprising a microphone supported by a bracket into the center of said loop.

An apparatus comprising a birdbath and a filter that effectively filters mosquito egg, larva, and pupa material from water in a birdbath reservoir. Further, the birdbath comprising a micro controller for controlling filtering operations and, still further, can comprise a pump.

A chemical mass deposited in rain gutters to discourage mosquitoes from using said rain gutters to deposit eggs.

An apparatus containing an odorous substance, which attracts insects or encourages insects to lay eggs on it, and said apparatus also comprises a means to terminate eggs larva or pupa from developing into adults or to kill adults. Further, said apparatus containing an odorous attractant to attract flies wherein said apparatus also comprises an electrified grid to electrocute said flies when they make contact with it. Still further, said apparatus wherein said termination means is a chemical. Yet still further, said apparatus wherein said termination means is electricity.

A mosquito research apparatus comprising an entry and exit detection means and a light emitter means, buzz detection means for monitoring mosquito wing sounds, a thermal emitter means to attract and alternately repel mosquitoes and a frequency emission means to simulate mosquito wing noise and other insect sounds. Further, said research apparatus wherein water contains a low level radioactive isotope that will mark insects that make use of the facility and thereafter be recognized by other research devices in a test zone that can detect presence of said isotope on said insects. Still further, said apparatus further comprising a microcontroller to collect data and control activity of emitters and detectors.

An electronic device that emits recorded frequencies collected from bats during times when said bats are feeding on flying insects to discourage flying insects from entering an area where the frequencies can be recognized by said insects. Further, said device wherein said signal emitted is a signal recorded from natural sounds made by mosquitoes enclosed in a test chamber containing mosquitoes and dragon flies together.

A method of using an apparatus comprising a reservoir for holding for holding a liquid medium suitable for reproductive use by mosquitoes or for harboring adult mosquitoes wherein said reservoir is located so as to harbor mosquitoes or to lure a female mosquito to deposit eggs in said liquid medium, said apparatus further comprising a periodically activated means to destroy the life of any stage of maturing egg deposits, larva, pupa and adults, the method comprising providing a reservoir for holding a liquid, at intervals removing mosquito eggs, larva, and pupa from the liquid medium in which they are growing, thereby terminating their development, and providing an available reservoir for further use by other female mosquitoes. Further, a method of mosquito population abatement using said apparatus wherein said step for removing comprises straining said liquid medium at intervals to remove mosquito reproductive bio-matter and terminate the biological growth of the eggs, larva and pupa. Still further, a method of using said apparatus comprising forming said reservoir in the ground so as to attract mosquitoes for egg laying, draining said reservoir into a flowing stream at intervals to disrupt the development of mosquito, biomass and refilling said reservoir after draining.

A reservoir and means to destroy life which comprises in a car tire, a valve and a water supply.

A reservoir for holding a liquid which is suitable for harboring mosquitoes, further comprising a signaling means to generate an alert to a caretaker at an interval to flush the reservoir contents that is possibly harboring mosquito reproductive mass.

A reservoir and means to destroy life or an insect abatement means which comprises a rain gutter that comprises a leakage means to drain residual water remaining in said gutter after a rain to eliminate a possible mosquito breeding habitat that is inherent in said residual water.

A process for the production and distribution of automobile tires comprising applying a chemical on the inside surface of said tires wherein said chemical will mix with any water that may enter said tire after tire is disposed and said mix is a spoiling means to deter a mosquitoes use of said mix as an egg laying site.

An apparatus that fits in a window frame venting inside warm air and $CO_2$ outside comprising openings for insects to enter into apparatus after which an air-stream and insects caught in said air-stream are carried along through a structure comprising baffles and said insects collide with said baffles inflicting damage on said insects that come into contact with said baffles wherein said air-stream is generated by a fan on down-stream side of said baffle structure and said fan ejects damaged insects into outside air. Said apparatus wherein said baffles are coated with abrasive. Further, said apparatus wherein said baffles are coated with insecticide or oil. Still further, said apparatus having a baffle structure comprising a reservoir above said baffle structure and at least one hole in said reservoir drains liquid onto underlying baffles comprised in said structure.

A reservoir and means to destroy life wherein said reservoir comprises a channel having a simulated earth topography of natural earth features and a live plant to entice insects to use said channel for reproductive activities. Said apparatus wherein said channel holds a liquid comprising water. Further, said apparatus wherein said reservoir comprises soil. Still further, said wherein said channel comprises a means to destroy selected from the group consisting of an insect extermination means and a flooding mechanism to release liquid and flush away insect biological material occupying said channel.

A tool that can be used to puncture holes in rain gutters that are installed on buildings to produce a feature that functions to perforate the gutter floor in order to drain any standing water left in drains resulting from obstruction or angle of drainage problems.

A filter that collects biomass as liquid is flushed from the reservoir to save it for scientific evaluation purposes and to test for the presence of and identification of viruses carried by mosquito vectors.

An apparatus that will attract female mosquito egg layers that has a flush capability to purge and refill a reservoir wherein this apparatus is equipped with valves that are managed electronically.

A birdbath fitted with a system to purge mosquito biomass by filtering or flushing.

DETAILED DESCRIPTION OF THE INVENTION

A mechanism of the bio-cycle interrupt device to act on water may employ filters, drainage, scooping, even electric shock to the water in order to eliminate the developing egg, larva, pupa. Simplicity and low maintenance is important as well as rugged durability. One embodiment with advantages would take the form of a window box on a home window, a fence, an apartment deck railing, or be supported on a pole near natural creeks, canals, rivers, swamps etc. It is known that mosquitoes will travel up to two miles from their breeding grounds. A mosquito approaching the natural breeding ground may be enticed with an early convenience before reaching the natural areas from which they came.

There is an option to put the devices where they can be supplied with new water on demand. This would allow the water to be dumped at regular intervals and replaced with new water to eliminate biomass. This could be done with a lawn-watering timer, which turns water on to water an area and then turns the water off. A short cycle would replenish the old water in a bird bath embodiment with new water. The new water entering under pressure would eject the larva, egg rafts, and pupa out of the water reservoir. The water drain and refill may also be controlled by a micro-controller. The reservoir can be designed to rotate such that it would dump the old water and upon being upright again be filled with fresh water.

Eggs hatch into larvae in about 3 days. The larvae live in the water for 7–10 days while maturing into the pupa. In 2–3 days these pupa have developed into adults and fly away and mate. It takes about two weeks for the cycle to complete. One water filter operation every other day would impact a single egg deposit about seven times during anticipated development. Dumping the water every other day would primarily dumping eggs.

The current prevailing mosquito control method is spraying chemicals in breeding areas. The long-term impact of chemicals is always a serious concern. Minimal use of chemicals near residential areas is a continuous consideration in most spraying programs, as long term effects on humans and the environment are not known. The bio-cycle interrupt method entailed in this invention is free from these concerns.

The method does not restrict itself to one insect. It can be extended to any other species requiring control. Researchers do not support the effectiveness of bug zappers that attract insects to light and then electrocute them. They contend that the attraction to the area brings in more mosquitoes to the general area and makes the area worse for human occupants. These devices require a great deal of nearby power, which makes them expensive and localized to populated areas.

Figures 2A, 2C:
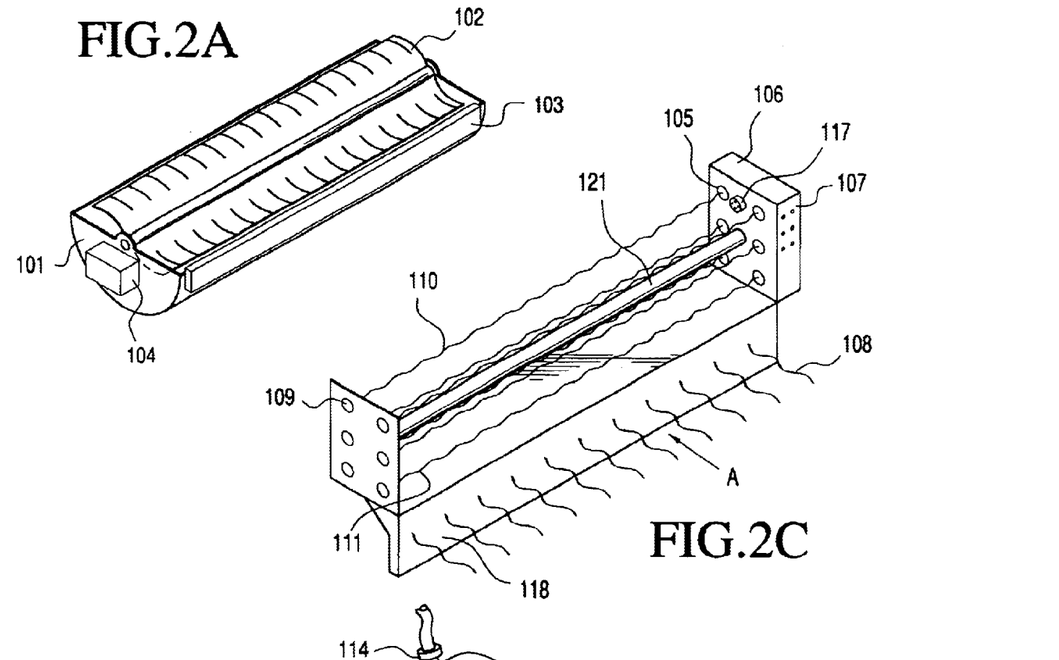
FIGS. 2A–2D depict an embodiment of an apparatus that comprises a trough, a filler assembly, an enclosure to attract insects, a data collection device including means to attract mosquitoes and a configuration of the fly population reducer.
Figures 2B, 2D:
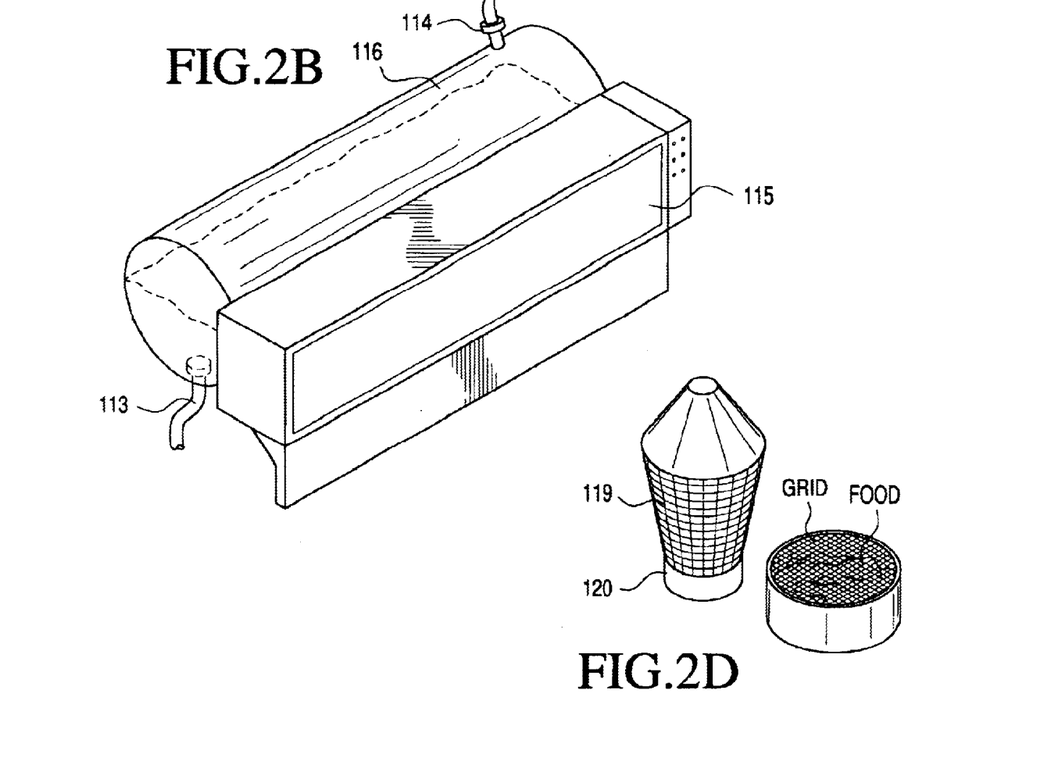

Another insect to which the bio-cycle interrupt methods can be applied are flies. The inventor has conducted an experiment that has proven effective for fly control, using the electrocution method. The placement of odorous material, like a can of cat food, inside of an electrified grid attracted flies during the day, prior to a barbecue. Throughout the day the flies were attracted and electrocuted very effectively. The barbecue was relieved from the normal pest problem. The method of attraction using light works only in at night. As shown in FIG. 2D, a repository of odorous material 120 is affixed under an apparatus that also comprises an electrified grid 119. Flies attracted to the odor are often killed upon making contact with the electrified grid. The flies are seeking a place to deposit eggs and provide a source of food for the larva after the eggs hatch. Electricity can be applied to the odorous mass to electrocute the larva after they hatch. Electrical pulses of thousands of volts can be derived from ignition coils similar to those used in automobiles.

The addition of the odorous attraction provides a device that works during daylight hours. Day feeding mosquitoes may be attracted to some odors more than others or possibly a thermal radiator simulating body heat of a potential blood meal. This data can be accumulated using the methods and devices explained herein.

Other methods are also useful. A battery driven pump could be employed to re-circulate water through a filter, which catches the larva and eggs. This may require a simple plastic impeller pump and an inexpensive controller, such as MicroChip PIC. If the inexpensive chip is used, it can be employed to develop and collect data, from sensors, related to the use of the facility. The micro-controller could measure insect landings on the water by mosquitoes to derive a count of the population. This does assume the water is still, and most of the time it will be except in wind and weather conditions disturbing mosquito activity. During these times, the controller would sleep to conserve power. The two most frequently proposed methods of mosquito control methods is chemical spray and active elimination of breeding places like, old tires, bases of flower pots, birdbaths, potholes clogged rain gutters, discarded cans etc. The many variations of standing water exploited by mosquitoes suggest that they would succumb to the convenience device proposed in this invention.

Deriving power to operate the device is also a consideration related to the emissions of the device. In remote areas, solar cells can charge batteries, weights can power a gear train, like grandfather clocks, household power, and others sources are available. The advantage is that the basic device has a low requirement for power since it operates once every two or three days. A system that drained and refilled every two days would be also be sufficient to reduce mosquito populations. A timer would open a drain and after draining open a water valve to refill the reservoir.

Many insects are attracted to light. By providing a light in combination with the apparatus proposed herein, we can improve its' attraction and effectiveness.

It is known that adult mosquitoes find one another by the frequency of the sound or buzzing, that their wings make while flying. Replication of these frequencies by the controller will attract the adults. The device may intermittently replicate these frequencies to divert the insects and attract them to the apparatus.

Many embodiments and types of apparatus can be developed to interrupt an insect's bio-cycle, for example, disrupting the development of eggs into adult insects.

A cylinder with a screen installed that is resting at the bottom which is provided with water to attract the mosquitoes is simple and cost affective. The screen can be lifted through the water until it emerges with the egg deposits it has filtered out of the water. It would then remain out of water long enough for the mosquito biomass recovered to dry up and die. The filter lifting cycle is triggered by temperature, daylight or just a repetitive timing cycle. Raising the contents near midday would provide fast drying, and then the filter can be lowered into the water again, in time for the evening hours when the insects become active. Various climates may employ different cycles of filtering and drying time. The drying time is the period of time that the filter is held out of the water. This would be long enough to insure that the insect biomass would become dry and die from lack of moisture.

Given that female mosquitoes are in pursuit of a blood meal a fixture may be attached to the suggested device that presents a surface that radiates a temperature similar to the body temperature of a potential blood meal.

A heat sink can be added that will absorb solar radiation during the day and radiate it into the cool evening. The speed of mosquitoes development cycle has a dependency on heat such that when the water it is warmer the development cycle is shorter. Female mosquitoes may prefer warm water. The nature of the water, being natural water and/or stagnancy may be a factor. This data will be accumulated during testing and deployment.

Preferably, the bio-cycle interrupt devices are placed near areas of feeding opportunities and natural breeding areas. Parks near water, summer camps, marinas, lowlands, zoos, etc. are all good placement scenarios. These areas are "high yield" areas. This means that the blood meal and breeding area are close together. Installation of a permanent nesting apparatus in these areas would be justified. A permanent installation could cycle power, water, infrared signature, the controller, on and off as needed. This embodiment is less restrictive than a solar, or battery powered device. Water can just be drained every two days and replaced if filtering is not employed.

A landing count measurement device can be installed to measure the tiny ripples of a mosquito landing in order to accumulate statistics of use. The electronics, transducers, and background noise filtering methods are common to micro-controller and sensing technology and readily available in the industry. The mammal temperature emulation technique will use considerable power when operating to provide radiated heat. Use of infrared light may not have the same attractive results as warm body emulation. This can be determined by applying the test and measurement devices and attachments defined herein.

Often mosquitoes find convenient water in which to deposit eggs. One location they exploit is the rain gutters affixed to buildings to collect water run-off from roofs. Leaves from trees often spoil the drainage which results in puddles of standing water remaining in the drains. Distortion of the drain slope can also result in standing water.

By mixing chemicals that are toxic to mosquitoes with a base which dissolves slowly a formula can be developed which may be tossed onto roofs that will spill into the rain gutters releasing toxins to make the standing water unattractive for egg laying mosquitoes. The form factor may be varied in such a way to prevent the chemical base from being washed away during heavy rain. This chemical bearing mass may be attached to a wire holder that affixes to the outside edge of the drain while allowing the chemical to be held down against the bottom of the drain in contact with any pooled water. Over time the mass will dissolve as it releases toxins after being wetted by the rain each time. The life of the mosquito toxic mass will be formulated to provide an effective life and to be active over the duration of the mosquito season. The material to discourage egg laying need not be toxic if it is preferred an oil base material can release enough oil base to form a film over top of the standing water which will make it unattractive to a female mosquito looking for an opportunity to lay eggs.

The appropriate design for this invention can vary with location, climate and logistical support that will be available. Solar power panels can provide recharge current to battery operated devices. Near residential areas plug in devices are feasible. As shown in FIG. 1C, 09 shows a stack of the devices that can be installed near parks and recreational areas on a permanent basis. Investment in the more permanent facility is warranted where twilight and nighttime activities by people are typical.

Gutter Balls

Figures 3A, 3B:
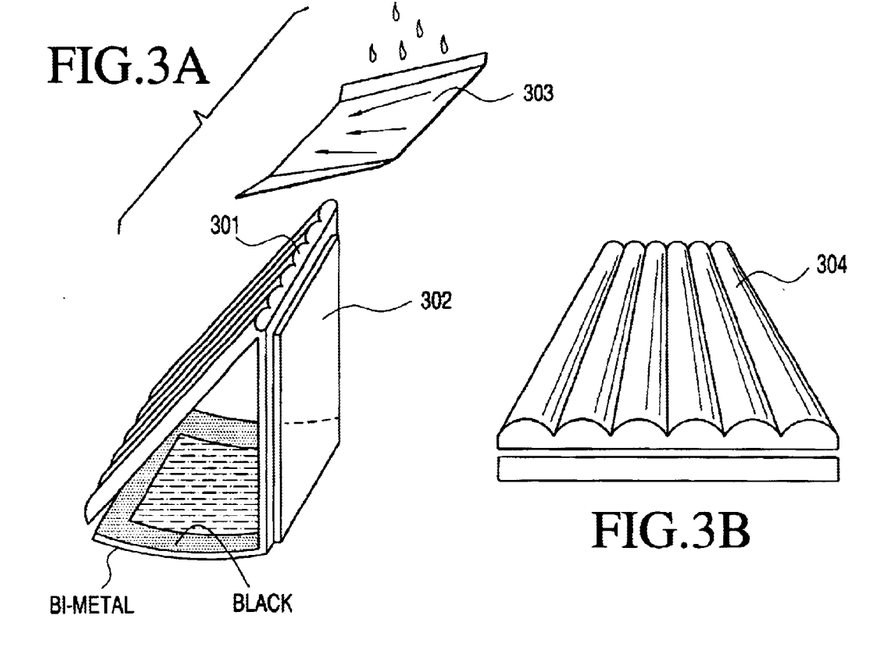
FIGS. 3A–3C depict an embodiment of the present invention that uses the sun's radiation to open and close an apparatus entry way during daylight and to further collect the suns energy to heat the inside of the chamber above the tolerance level of eggs, larva, and pupa.
Figure 3C:
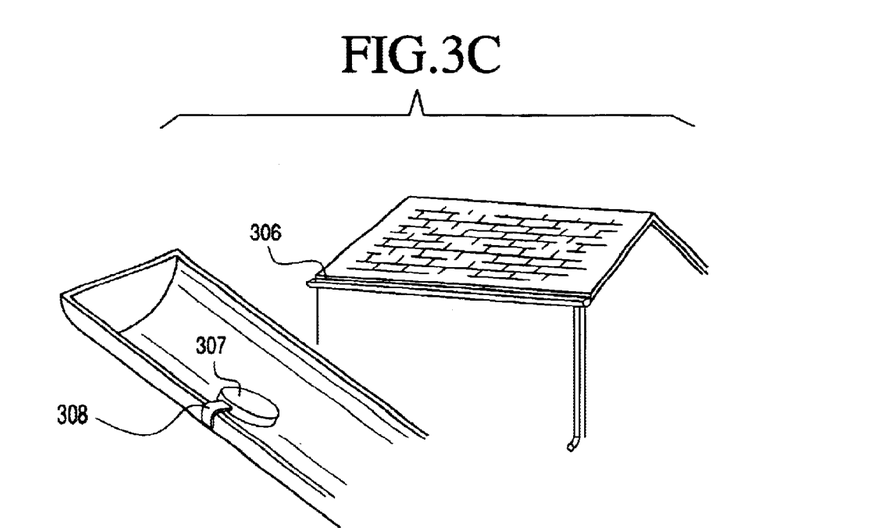
Figure 4:
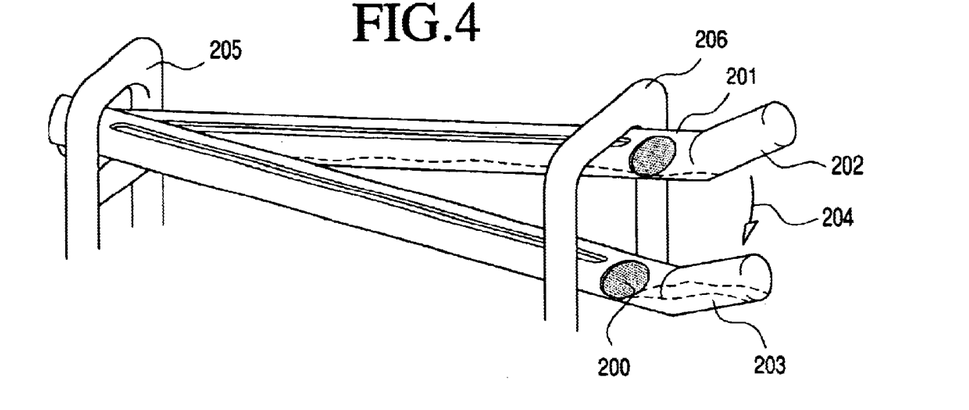
FIG. 4 depicts an apparatus for positioning the filtering method according to the present invention using a section of pipe.
Figure 5A:
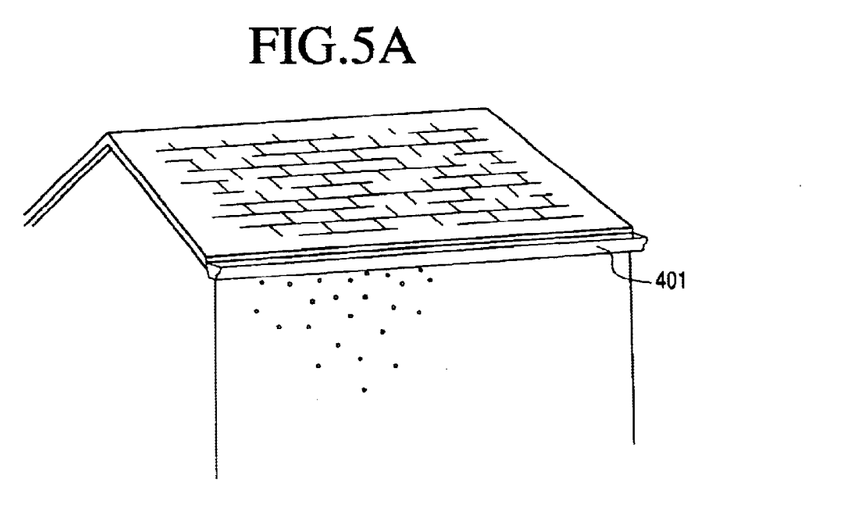
FIGS. 5A–5B depict a roof gutter that has a perforated bottom such that it will not hold liquid for other than a short amount of time.
Figure 5B:
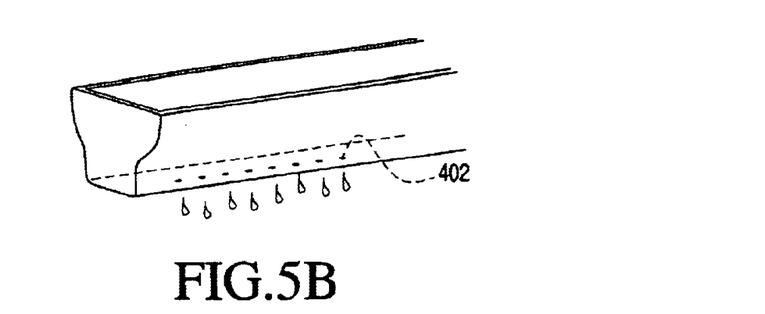

Mosquitoes often make use of puddles of water formed in rain gutters, for laying their eggs. This opportunity can be denied by contaminating the water that remains in the gutter. As shown in FIG. 3C, a time-release mixture formulated in a mass 307 which dissolves in water can be implanted in the gutters to release chemicals toxic to mosquitoes to discourage their use of the water left standing in the drains. A wire holder 308 can affix the mass in place or it could just be weighted strips. Magnet strips with chemical toxins embedded in them can be installed during routine drain cleaning, or whenever needed. Removal of this opportune rain gutter mosquito nursery will encourage the insects use of the next best available facility which may be to employ the device proposed in this invention. A strip of material that will release a discouraging chemical into the water may be installed with new rain gutters. A variety of mechanical forms may be used to affix the mass containing the chemical to be used. A slow release of oil will produce a film on the surface of the standing water. This will discourage females from depositing eggs.

When the discussed apparatus is equipped with various emitters and detectors a research facility can be created to exercise the emitters and collect data from the sensors. Having a capacity to monitor wing buzz and passage in and out of the chamber a capability is derived to discover reactions of insects to the emitters.

An ultrasonic transducer emitter may be employed and activated at frequencies that are consistent with bat feeding. A pattern of ultrasonic frequencies can be discovered that is effective in discouraging mosquitoes from entering an area. The frequency, pulse length, repetition rate and volume can be varied to discern the most effective signal profile. The micro-controller can then repeat the emissions profile and collect data from the research platforms to evaluate the effectiveness of the various emission profiles. A micro-controller will store the emission pattern for playback. This will help observe responses of mosquitoes and other flying insects. The emitted frequencies will also include the wing beat frequency of dragonflies, another enemy of the mosquito.

Much in the same manner as the bio-cycle interrupt methods and devices can be varied, the simplicity of the abatement methods disclosed yield opportunity to produce many forms and embodiments that will provide the desired functionality. The methods do not appear in the art of insect traps or insect population abatement techniques. Generically the methods are not intuitive. One method provides a site for mosquitoes to breed in. Another method puts holes in rain gutters. Both of these ideas are typically bad things to do. The novelty derives from the oversight of these for so long, and upon learning either method it occurs to one that they would be effective.

Flushing

Figure 9:
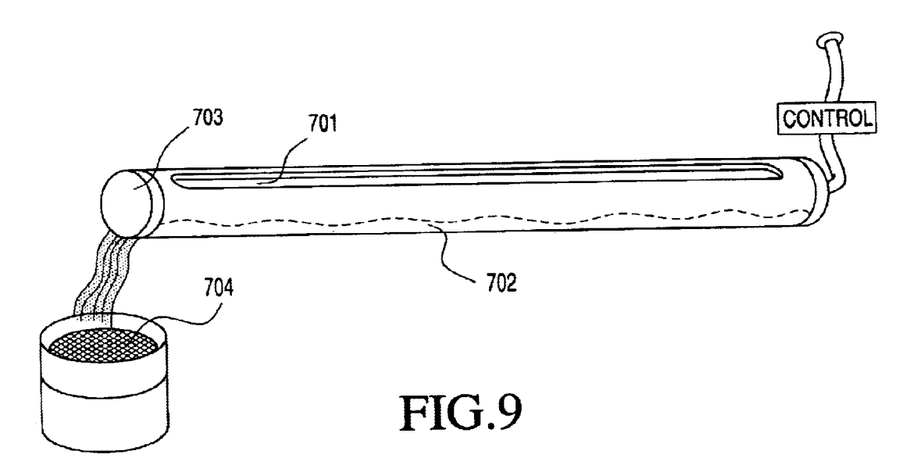
FIG. 9 depicts a pipe comprising an opening for insect entry and exit.

Many form factors can be devised to produce the apparatus. The methods of filtering and flushing can be achieved with pumps, actuators, and motors with a variety of reservoir shapes. One form of the flushing method is represented in FIG. 9. The reservoir is any form, which will retain or contain a liquid. A valve on one end is opened to release water in the trough along with the biomass. A water tank can be used to supply the replacement liquid if the apparatus is remotely located. Other installations near recreation areas may use a fixed architecture with plumbed in supply pipes providing liquid and local electricity to automatically control the flushing and replacement cycle of the system. For example, FIG. 9 depicts a pipe comprising an opening 701 for insect entry and exit. A valve on each end actuates periodically and the inrush of new water 702 from supply valve CONTROL carries along old water to exit the far end of the pipe and out through flap valve 703 and thereby flush any biomass present in the trough. The biomass may be captured in a strainer 704 for study.

After mosquitoes have used water to lay eggs the development cycle begins. After two or three days filtering the water will remove the biological material from the water destroying the insect bio-matter.

Filtering

There are many ways to apply this method of mosquito population abatement. Reservoirs of water can be filtered by pumping the liquid through a filter and returning clear liquid to the reservoir. A trough of water can be tilted to pass the liquid through a filter in the trough and after an interval return the trough to a level position. This type of abatement can be applied to a birdbath embodiment.

In a preferred embodiment of the present invention, an attractive lawn ornament like a birdbath can easily be fit with the mechanism to filter the water contents at an interval that will serve to destroy the mosquito reproductive material from the water provided for the birds.

In another embodiment of the present invention, the automobile tire is a very effective nursery for mosquitoes. When they our outdoors they can catch rain and retain it inside of the dark cavity of the inside wall of the tire. The black tire absorbs sunlight and produces heat, which expedites the growth rate of the hatch. The ceiling of the internal chamber slows the loss of water through evaporation. A replica of a tire can be equipped with a rotating arm, which pulls a filter through the internal chamber to pick up all the biomatter from the water. When the tire shape is not level most of the water will accumulate on the lowest side. The filter arm will come to rest at the high side and bio-matter in the filter will desiccate, Rain-gutters are installed on buildings to carry the water falling on a roof away from the buildings foundation. They can easily retain water that does not drain properly. The common rain-gutter can be improved by adding minute drain holes or slots in the bottom of the channel will drain remaining rainwater and deny the opportunity of the mosquito to use it.

The type of opening or hole can be made in a variety of ways, which would be obvious to anyone skilled in metal work.

New rain gutters can be produced upgraded to mosquito conscience grade with drainage holes during manufacture. The rain-gutters in place are still a problem. A device can be created to puncture the floor of gutters that are installed.

A tool that is fitted on the end of an extension means can be made to allow a user to reach the installed gutters. This tool will provide a pin to puncture the light gutter material and a counter opposed die will be pressed against the other side of the material. The opposed die will resist the downward pressure of the material surrounding the pin but allow the pin itself to make the puncture into the void on the die. Many versions of this tool could be constructed by one skilled in the art.

During manufacture of rain gutters the leakage openings can be built into the shaping roller, rolling against the bottom of the channel in a manner with pins and die holes on counter opposed rollers.

Figure 1A:
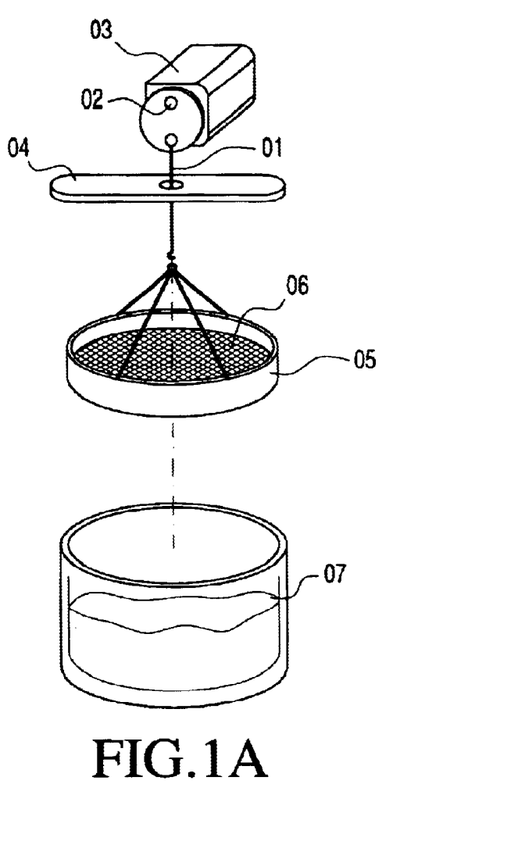
FIGS. 1A–1D depict several representations of mechanical form factors that will accomplish filtering mosquito biomass out of the standing water made available for their use. Many forms of apparatus can be contrived to accomplish the disruption of the normal biological development of deposited eggs.
Figure 1B:
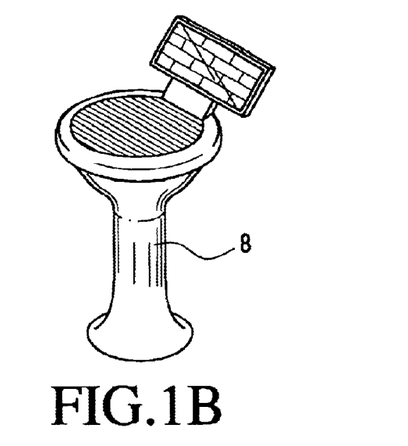
Figure 1C:
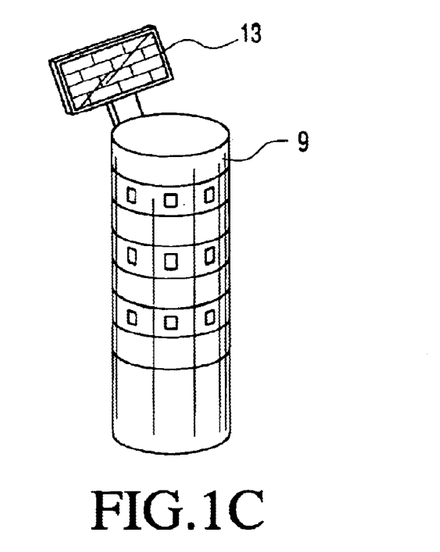
Figure 1D:
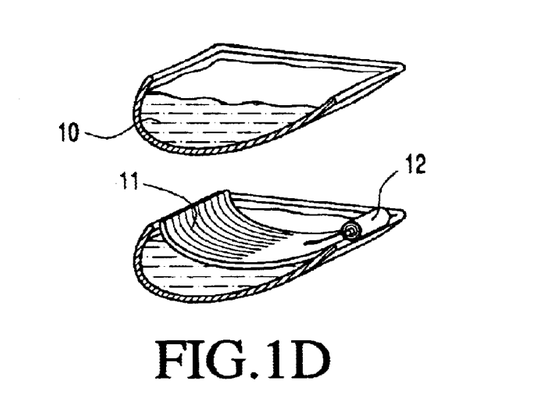

In an embodiment of the present invention, FIG. 1A depicts a simple reservoir 07 and a filter 06. The filter normally rests in the bottom of the reservoir. On occasion, the motor 03 lifts the filter through the liquid to remove any insect material that may be in the liquid. As shown in FIG. 1B, a birdbath 08 embodiment is based on the same principle but with an additional solar panel to derive power. A stack of the filter/reservoir modules 09 are shown that drain water from the top module through a filter and then into the lower module and so on down the stack, as shown in FIG. 1C. FIG. 1D also depicts the reservoir 10 and the filter 11 with the filter raised after passing through the reservoir liquid. The filter is raised by a bimetal spring contained within a black mental enclosure 12.

The drawings of the present specification are described below in detail.

As shown in FIG. 1A, 07 is a reservoir of standing water. The tray 05 is lowered into the reservoir and water passes through the filter 06 as the tray lowers through the water to the bottom of the reservoir. Further as shown in FIG. 1A, 01 through 04 are related to lifting the filter tray 05 to raise it through the water and collect the bio-mass at issue. The motor 03 will turn the flywheel 02 one half revolution to lift the tray out of the water, by pulling the attached cord 01. The bracket 04 guides the cord to pull vertically as it passes through it.

Also shown in FIG. 1D, 10 is another embodiment wherein the filter 11 is lifted by a bimetal heat actuator 12 that is attached near the hinge of the device and, in FIG. 1C, 13 represents a solar panel which can be attached to any unit to provide energy for operation.

In FIG. 2A, another representation of a device 101 is shown. In this model a filter 102 rotates through the water reservoir to collect the biomass and stops in a position holding the biomass out of the water to dry up and die. A motor 104 turns the filter at a time which is regulated by internal control electronics, which are commonly known, and 103 is a thermal radiator emanating heat to attract mosquitoes by radiating the heat range common to human targets.

As shown in FIG. 2A, the liquid reservoir 101 in a trough and a filter assembly 102 rotated by a motor and controller 104 can interrupt a mosquito bio-cycle when the trough lifts mosquito biomaterial up into the air to dry out while still leaving the water to remain available for insect use. In FIG. 2B, 113 through 116 illustrate an enclosure 116 with open ends and equipped with an inlet valve 114, a drain valve 113 and 115, a heat radiator used to attract insects. A different device, as shown in FIG. 2C, with some attachments will provide a source for data collection, and means to develop variable methods of attracting the mosquito to the area. Two light-walls 110 and 111 are employed that will allow collection of entry into the facility and exit from it. This will provide trial data on success of various methods of attraction to enable research into more effective methods. Attachments include emitting light bulb 121, emitting LED, light emitting diodes 109, thermal radiation 108, wing buzz audio out 107, sound sensor 117, control and data collection module 106.

Also shown in FIG. 2D, 119 and 120 depict one way the fly population reducer can be configured. FIG. 2D depicts an opening 120 into which an odorous substance is placed. FIG. 2D depicts an electrified metal grid, 119. Flies can gain access to the substance through wide openings but when flies are circulating around bait area they collide with the electrified grid and die. The odorous attractant works well to attract flies during the day and will clear up a deck area for a barbecue very effectively.

By collecting data on mosquitoes behavior with these facilities we can improve opportunities to develop the most effective combination of attractors, water chemistry, buzzing, heat, light, pheromones, etc. As shown in FIG. 2B, device 116 has several attachments to it. The connection 114 is for a water supply, and 113 is a water drain. The attachment 115 is expanded to demonstrate its research related functions. Attachment 115 comprises two light walls 111 and 110 as shown in FIG. 2C. A mosquito on a flight path A will pass through the light wall 111 first and then through light wall 110. This is counted as one entry. The reverse will be true when the mosquito leaves the facility. This data is accumulated by a micro-controller with sensors attached to the light receiving photo-diodes 105 which sense light emitted by laser diodes 109. Further shown in FIG. 2C, buzz detector 117 senses the wing beat frequency of the mosquitoes. Changes in frequency, repetition, change rate are all collected by the micro-controller and stored for later analysis, replay, number, time in and out, comprise data that can be used to within research programs. Detector 117 is a transducer that can emanate the learned buzz sounds to derive response data from the mosquitoes. FIG. 2C shows radiated heat waves from the heat generator 118 which will be used in activities to modify the attractiveness of the facility and aid in measuring insect responses.

FIGS. 3A–3C represent an embodiment of the reservoir and filter method. In FIG. 3A, 302 is a container that has a bottom side reservoir water housing and a back wall and 301 is a panel that comprises transparent magnifying lenses 304 applied over the containers front panel substrate, as shown in FIG. 3B. The floor of the reservoir is made of temperature responsive bi-metal. The sun shines through the magnifying lenses and heats the bottom of the reservoir and causes it to move such that the entry passage at the bottom of the front panel will open during the evening and be closed during sunlight. This uses the sun's radiation to open and close an apparatus entry way during daylight and to further collect the suns energy to heat the inside of the chamber above the tolerance level of eggs, larva, and pupa. New wetlands projects being developed in Western United States can take advantage of this design. Extension and contraction of various materials in response to heat will operate the entryway. As shown in FIG. 3A, the front surface of one apparatus is arranged with transparent focusing lenses to collect the suns energy and focus it inside the chamber. Also in FIG. 3C, 306 through 307 represent a view of a building equipped with rain gutters 306. The gutter has attached to it and hanging down onto the bottom a fixture that can be attached 308 comprises a chemical mass 307 that can foul any remaining water in the gutter after a rain such that it is toxic to a female mosquito and she will reject it as safe place to lay eggs.

FIG. 3A shows another embodiment of a device 302 to implement bio-cycle interruption. Insects seeking shelter, shade or egg laying opportunities enter through an opening in the device to access the water, shelter or habitat. At night when it is cool the entrance is open. When the sun rises, the suns rays are collected by magnifying lenses 304 and focused into the chamber onto black surfaces to collect the heat. The rising temperature heats the bi-metal structure, which will change its shape in response to temperature, and operates to close the entrance. This will result in biomass and insects trapped inside as the temperature rises beyond bio life tolerance temperature of the targeted insects. Also shown in FIG. 3A is a rain collection fixture 303 for which the size may be of various size depending on frequency and amount of rainfall to be collected.

FIG. 4 depicts an apparatus for practicing the filtering method of the present invention using a section of plastic pipe 201 that is held off the ground by two support frames 205 and 206. The pipe has a slit in the side for entry of insect egg layers. Periodically one end of the pipe is lowered 204 and the liquid strains through a filter 200. Water 203 accumulates in the holding reservoir 202 and will return to the pipe upon raising the end that was lowered. The operation can be done manually or with electronic control of motors.

FIGS. 5A–5B depict a roof gutter 401 (FIG. 5A) that has a perforated bottom 402 (FIG. 5B) such that it will not hold liquid for other than a short amount of time. The water will not remain in the gutter after a rain-fall but will slowly leak out draining any water that may have been trapped or poorly drained and thereby making this common breeding habitat unavailable to insects. The major water from a storm will still be carried away from the foundation of the building, (their purpose) and the minor amounts not drained will leak out.

Figure 6:
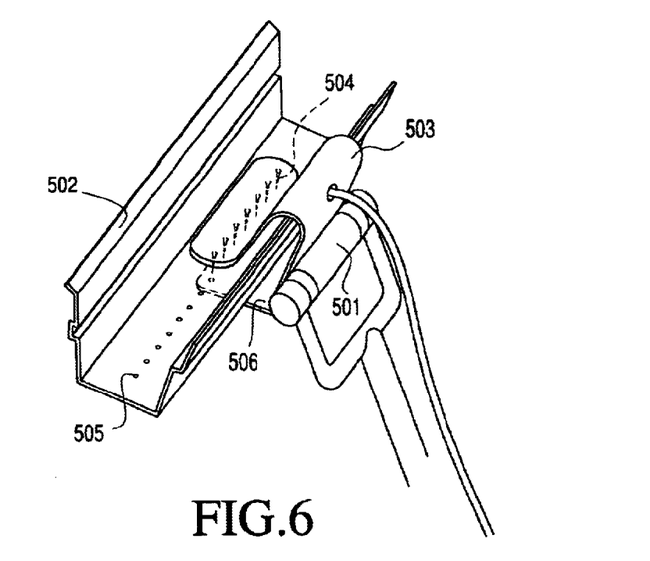
FIG. 6 shows one embodiment of a tool that could be used to perforate gutters after they are installed.

FIG. 6 shows one embodiment of a tool that could be used to perforate gutters after they are installed. The mouth of the device can fit over a gutter 502 and while being held in place the top jaw 503 is pulled back on it's spring loaded hinge 501 and, when released, teeth 504 in the upper jaw 503 will snap down into the bottom of the gutter and penetrate the gutter 505 so that the teeth penetrate the gutter and pass into the lower jaw 506 which supports the gutter against the down-coming energy and forms a die for the penetrating teeth.

Figure 7:
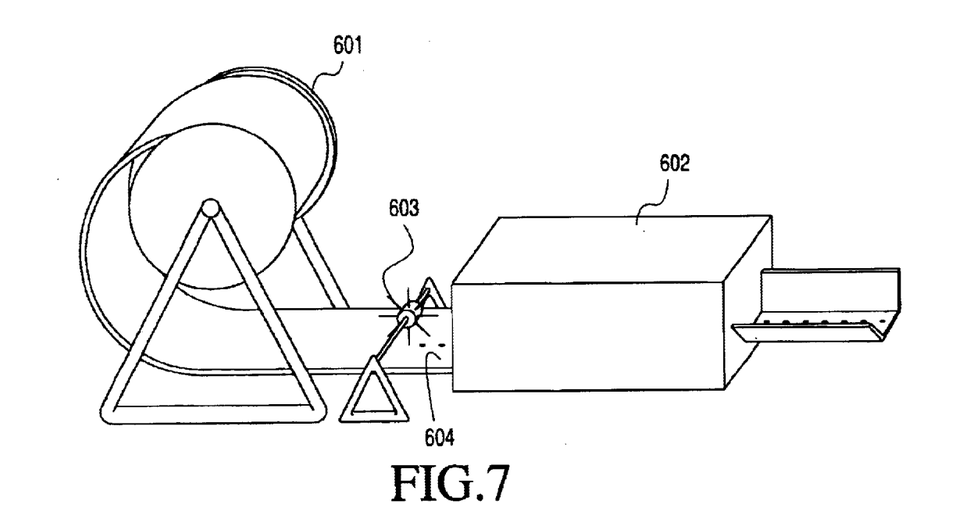
FIG. 7 depicts a roll of aluminum being run through a rain gutter-shaping tool with the addition of a perforating wheel that perforates the floor of the aluminum gutter.
Figure 8:
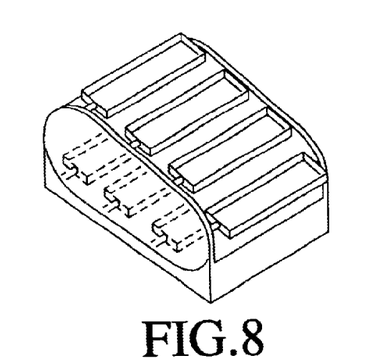
FIG. 8 depicts another embodiment of a rain gutter using trays in a circulating apparatus which opens tray up to mosquito access and slowly rotate over the days until the tray passes underneath where it is rotated to empty, refilled and then rotates to the top side again.

FIG. 7 depicts a roll of aluminum 601 being run through a rain gutter-shaping tool 602 with the addition of a perforating wheel 603 that perforates the floor of the aluminum gutter 604. There are many ways are possible to derive a porous bottom in a rain gutter to provide slow drainage of water remaining in them due to faulty alignment or non-level installation. FIG. 8 depicts another embodiment of a rain gutter using trays in a circulating apparatus which opens tray up to mosquito access and slowly rotate over the days until the tray passes underneath where it is rotated to empty, refilled and then rotates to the top side again.

Figure 11:
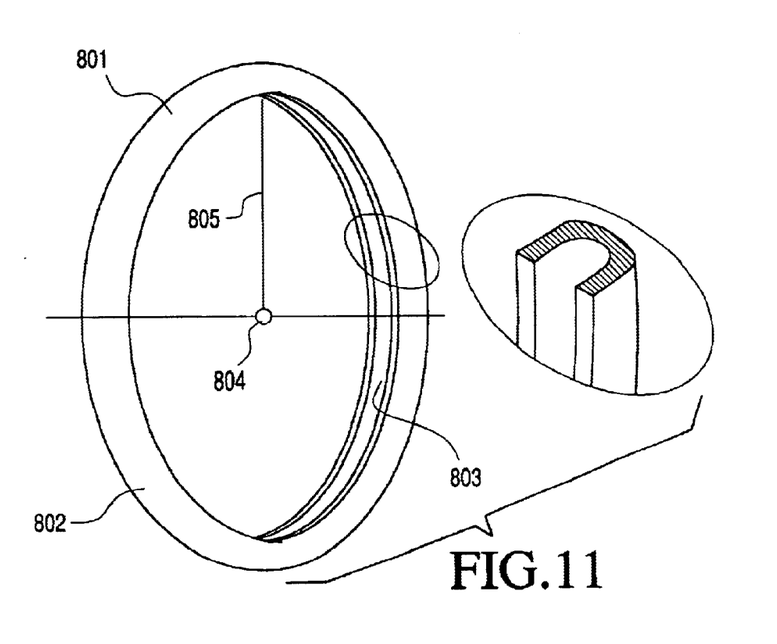
FIG. 11 depicts a test system for bio-matter removal comprising a parabolic shaped ring that has the shape of two parabolic shapes side A and side B joined together to form an enclosed elliptical shape and on its inside perimeter is a groove that also has a parabolic shape.

FIG. 11 depicts an embodiment of a device for testing the mid-cycle abatement of the present invention. A parabolic shaped ring has the shape of two parabolic shapes side A 801 and side B 802 joined together to form an enclosed elliptical shape. On it's inside perimeter is a groove that also has a parabolic shape 803. This creates two parabolic reflectors on each side of the perimeter and a smaller parabolic inside the perimeter that will reflect frequencies of energy toward the center of the opening. The center of the opening has a microphone 804 suspended from a bracket 805 that is affixed to the perimeter of the structure with a fine form factor to minimize interfering with reflected energy. Any insect flying through this opening will cause the sound to be reflected from the parabolic inside rim back toward the center of the opening. Other frequencies will be reflected by the larger parabolic inherent in the outline of the opening. In this way one can use the amplification of the reflected sound to detect small insects wing beat frequency or possibly other sounds emitted by them as they pass through the opening. This will be used to trigger other actions within the test system.

Figure 10:
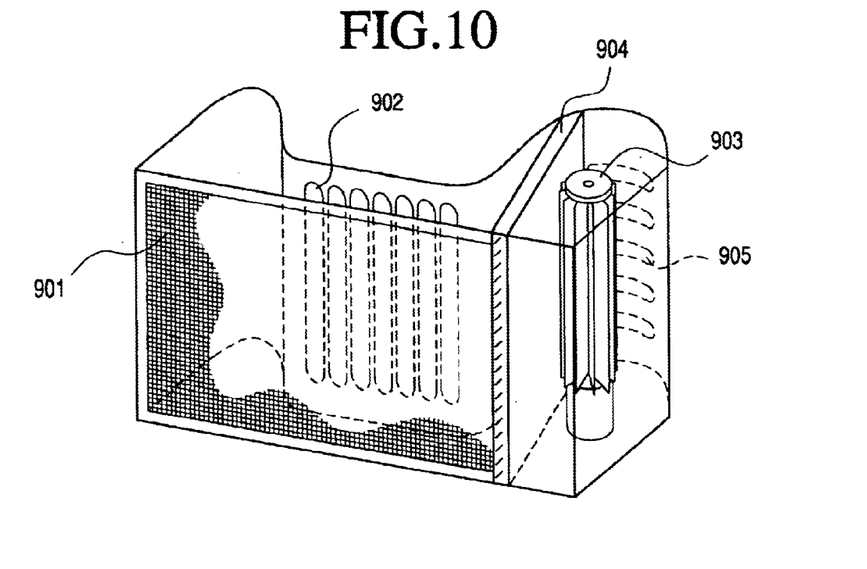
FIG. 10 depicts a window unit for a building that is operated to attract insects to the warm air and carbon dioxide that will emit from a dwelling.

FIG. 10 depicts a window unit for a building that is operated to attract insects to the warm air and carbon dioxide that will emit from a dwelling. Insects enticed to this site can enter through the back louvers and once inside a fan will turn on and suck the mosquitoes through a baffle contaminated with insect killer and eject him through exit louvers on the other side of the fan.

To provide an apparatus FIG. 10 that fits into a window like a room air conditioner that attracts insects to the air and warmth coming from the inside air that contains carbon monoxide exhaled from residents of the home in which the window unit is placed. The device has a screen 901 on the inside to keep insects out of the room but allow heat and $CO_2$ to escape. The outside of the unit has openings, 902 through which insects can pass to get inside the device. A fan in the unit 903 will activate occasionally and suck the insects through a baffle 904 that is coated with insecticide that will rub off on the insect as he is pulled through the baffle and poison the insect after he is ejected through the exit louvers 905 on the other side of the fan.

Figure 12A:
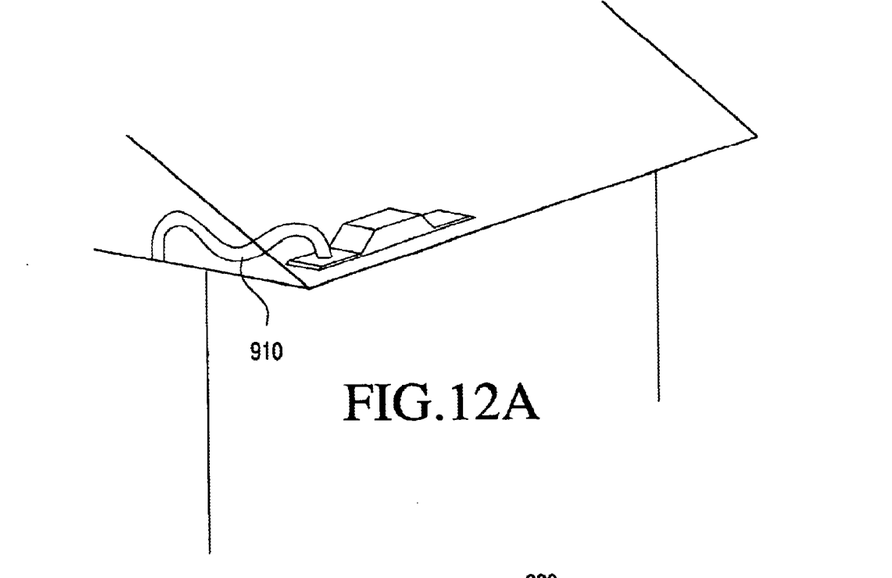
FIGS. 12A–12C depict another embodiment of an apparatus for attracting insects.
Figure 12B:
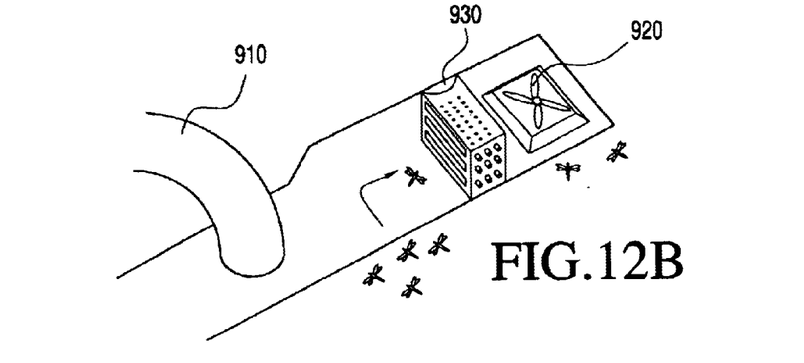
Figure 12C:
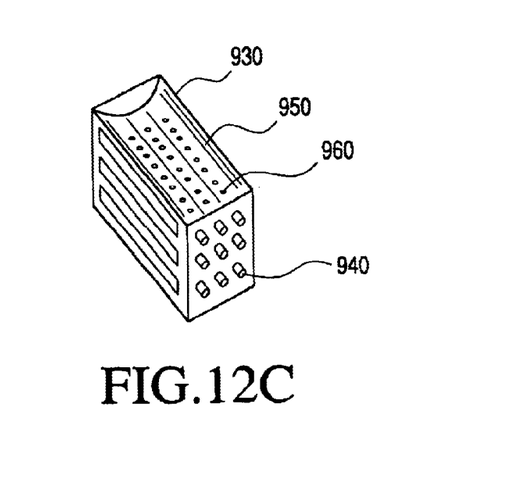

FIGS. 12A–12C depict another embodiment of an apparatus for practicing the method employed in FIG. 10. Warm air is vented from the hose 910 under the eve of a building. The warm air contains $CO_2$, which attracts mosquitoes, as does the warm air. As the insects approach the warm air they are caught in the draft from the fan 920 (shown uncovered) which pulls them through the structure comprising baffles 930 that obstructs the insects path of travel through the structure. The impact of the insects hitting the abrasive surface of the baffle, which may be wetted with insecticide, is sufficient to damage the insect and kill it. The baffles 940 are removable for cleaning and treatment with oil, insecticide or electrostatic powder, which will cling to the baffles, that develop an electrostatic charge from the air passing over them for an extended period. When the last baffles in the assembly are grounded the insect carrying an electrostatic charge from the first baffles will absorb the energy transfer when making contact with the second potential and cause it injury or death. Various electrostatic potentials can be applied to the baffles using control electronics if required for variable insect survivability. Concave reservoir 950 in the top of the baffle structure allows a liquid to be stored and leak down onto the baffles through holes 960 in the bottom of the reservoir. Gravity flow will keep the baffles coated with the material in the reservoir.

A permanent installation in areas where mosquitoes are a continuous problem can be supported by wind and/or solar power. The nearby water in wetlands provides a readily available supply of water and the requirement to execute the disclosed process every three of four days presents very low power requirement. These methods would include a pump, a battery and a controller.

Data Collection

The invention described herein will provide a tool for use in field-testing to determine what mixtures are most attractive to insects. In the use of the present invention there is a data collection capability when the flushed larva are retained in filters. This will aid in determining insect populations and the effectiveness of any new methods of mosquito control that are placed into trial situations in the area.

The generic method of providing attractive conditions for insect reproduction and thereafter spoil the development of the progeny is a viable control method for other insects as well.

Black Fly

The preferred egg-laying base for insects differs from species to species. The insects that prefer warm mud or dry areas near water can be accommodated by laying out a base in the bottom of the channel or reservoir that simulates various topologies. A method of laying down these topologies in the base of a channel is defined herein. To maintain any consistent control of the topologies and their effectiveness there is a need for a standard for each target insect and location. A base material of organic matter is pressed into the channel by a shaped wheel that is imprinted with the intended pattern. Seeds will be embedded in the areas of the design if they are deemed to be useful. This is a workable control to easily produce deploy and test effective insect control measures.

After mating the female deposits the fertilized eggs on rocks in swift streams, and the larvae develop aquatically, feeding on algae and debris. Adult flies first emerge in spring, and several generations may be produced each year Certain species in Mexico, Central America, and Africa transmit the disease organism that causes onchocerciasis, or river blindness, in humans.

This dangerous insect would find the topography in the bottom of the channel a matrix of running water with the building blocks included to begin and encourage the growth of algae and other potential food products. The idea is to include the most attractive site possible for the egg-laying parent. Depending on the biological cycle the control module will administer the subsequent program put into use. This may include the use of Pheromones; wing beat frequency, sound etc. The object will be to over time develop a channel with the most attractive parameters that can be discovered. It is assumed that an array of sensors available in data collection and signal processing are available for customization and data development. In the particular case of the Black Fly stopping the flow of running water at some interval may be effective in destroying the development of young Black Flies. The water may then be returned to flowing. This channel would be put down with water channels resistant to erosion. A large purging flow would overwhelm the channel topology and flush the bio-matter. Multiple methods are available to spoil the insect development. Introducing short-term poison would also be a reliable method.

Only a few embodiments are used herein to disclose the concept and required features and the embodiments disclosed herein should not be considered exhaustive of the present invention. The methods of interrupting a bio-cycle and of filtering and flushing are novel and effective. Many embodiments and changes are known to the ordinary skilled artisan to interrupt an insect's bio-cycle and to filter and flush a reservoir. Additional features can be added to entice and attract insects to reproductive locations increasing the potential for egg lying in the population reduction equipment discussed herein.

What is claimed is:

1. An apparatus for interrupting the bio-cycle of mosquitoes, comprising:
   a reservoir for holding a liquid medium suitable for reproductive use by mosquitoes or for harboring adult mosquitoes;
   a filter located in said reservoir, said filter adapted to strain the liquid medium and remove mosquito egg deposits, larva, pupa and adults; and
   means for automatically and periodically raising the filter out of said reservoir for a period of time to destroy the life of any stage of maturing mosquito egg deposits, larva, pupa and adults.

2. An apparatus for interrupting the bio-cycle of mosquitoes, comprising:
   a reservoir for holding a liquid medium suitable for reproductive use by mosquitoes or for harboring adult mosquitoes, wherein said reservoir is located so as to harbor mosquitoes or to lure a female mosquito to deposit eggs in said liquid medium
   a filter located in said reservoir, said filter adapted to strain the liquid medium and remove mosquito egg deposits, larva, pupa and adults; and
   an automatic, periodically-activated device for raising the filter through and out of said reservoir wherein said filter remains out of said reservoir for a period of time to destroy the life of any stage of maturing mosquito egg deposits, larva, pupa and adults.

3. An apparatus for interrupting the bio-cycle of mosquitoes as claimed in claim 2, wherein said reservoir comprises water.

4. An apparatus for interrupting the bio-cycle of mosquitoes according to claim 3, wherein said reservoir comprises a birdbath.

5. An apparatus for interrupting the bio-cycle of mosquitoes according to claim 4, wherein said automatic, Periodicallv-activated device further comprises a micro controller for controlling filtering operations.

6. An apparatus for interrupting the bio-cycle of mosquitoes according to claim 2, wherein said reservoir comprises a lawn ornament containing a said liquid medium.

7. An apparatus for interrupting the bio-cycle of mosquitoes as claimed in claim 2, wherein said automatic, periodically-activated device comprises a motor.

8. An apparatus for interrupting the bio-cycle of mosquitoes as claimed in claim 3, wherein said automatic, periodically-activated device further comprises a solar panel for charging a battery of said motor.

9. An apparatus for interrupting the Bio-cycle of mosquitoes as claimed in claim 7, wherein said automatic periodically-activated device further comprises a flywheel and a cord for lifting the filter out of said reservoir.

10. An apparatus for interrupting the bio-cycle of mosquitoes as claimed in claim 2, wherein said automatic, periodically-activated device comprises an electronic microcontroller.

11. An apparatus for interrupting the bio-cycle of mosquitoes as claimed in claim 2, wherein said automatic, periodically-activated device comprises a heat-activated bi-metal spring.

12. An apparatus for interrupting the bio-cycle of mosquitoes as claimed in claim 2, wherein said apparatus for interrupting the bio-cycle of mosquitoes further comprises a plurality of reservoirs and filters configured as modules arranged in a stack.

13. An apparatus for interrupting the bio-cycle of mosquitoes as claimed in claim 2, further comprising a thermal radiator.

14. A method for interrupting the bio-cycle of mosquitoes, comprising:
   automatically and periodically raising a filter through and out of a reservoir, said reservoir holding a liquid medium and being located so as to harbor mosquitoes or to lure a female mosquito to deposit eggs in said liquid medium;
   removing mosquito eggs, larva, and pupa from the reservoir with said filter; and
   terminating the development of said mosquito eggs, larva, and pupa.

* * * * *